(12) United States Patent
Kim et al.

(10) Patent No.: US 8,368,836 B2
(45) Date of Patent: Feb. 5, 2013

(54) LIQUID CRYSTAL DISPLAY DEVICE

(75) Inventors: Hyun Ki Kim, Daegu (KR); Jong Chil Lee, Gyeongbuk (KR)

(73) Assignee: LG Display Co., Ltd., Seoul (KR)

( * ) Notice: Subject to any disclaimer, the term of this patent is extended or adjusted under 35 U.S.C. 154(b) by 315 days.

(21) Appl. No.: 12/789,585

(22) Filed: May 28, 2010

(65) Prior Publication Data

US 2011/0109838 A1    May 12, 2011

(30) Foreign Application Priority Data

Nov. 9, 2009    (KR) .................. 10-2009-0107778

(51) Int. Cl.
*G02F 1/1333*    (2006.01)
(52) U.S. Cl. .................................. 349/58
(58) Field of Classification Search .......... 349/40, 349/58, 59, 60, 62; 361/679.02, 679.21, 361/679.22, 679.26, 679.27; 345/905
See application file for complete search history.

(56) References Cited

U.S. PATENT DOCUMENTS

2006/0133018 A1 *  6/2006  Okuda ...................... 361/681
2009/0310057 A1 * 12/2009  Kang et al. .................. 349/58

* cited by examiner

*Primary Examiner* — Dung Nguyen
*Assistant Examiner* — Tai Duong
(74) *Attorney, Agent, or Firm* — Morgan, Lewis & Bockius LLP

(57) ABSTRACT

A liquid crystal display (LCD) device adapted to prevent an intrusion of foreign substance and a light leakage phenomenon is disclosed. The LCD device includes a LCD panel; a backlight unit disposed under the LCD panel and configured to applied light to the LCD panel; a top case configured to encompass an upper edge surface of the LCD panel and to be combined with the backlight unit; and a plurality of protective pads arranged on a lower edge surface of the top case and set opposite the upper edge surface of the LCD panel. The protective pads configured to each include first and second side portions which are separated from the second and first side portions of the other adjacent protective pads by a fixed interval and engage with the second and first side portions of the other adjacent protective pads.

8 Claims, 3 Drawing Sheets

LIQUID CRYSTAL DISPLAY DEVICE

CROSS-REFERENCE TO RELATED APPLICATION

This application claims priority under 35 U.S.C. 119 to Korean Patent Application No 10-2009-0107778, filed on Nov. 9, 2009, which is hereby incorporated by reference in its entirety.

BACKGROUND

1. Field of the Disclosure

This disclosure relates to a liquid crystal display (LCD) device, and more particularly an LCD device adapted to prevent the intrusion of foreign substances and a light leakage phenomenon.

2. Description of the Related Art

Cathode ray tubes (CRTs), which are widely used display devices, are mainly used as TVs or monitors for measuring apparatuses or information terminals. However, the heavy weight and large size of the CRTs have been a major hindrance to the manufacturing of small, light electronic products.

To address this matter, LCD devices are gradually being used in a wide range of applications due to advantages such as lightness, thinness, and low power consumption. Accordingly, LCD devices are being manufactured to have larger screens, to be thinner, and to consume less power. Such LCD devices display images by controlling the amount of light transmitted through liquid crystal.

LCD devices are not self-illuminating display devices, unlike CRTs. As such, an LCD device includes a backlight unit provided on the rear surface of an LCD panel. The backlight unit includes a separated light source providing the light necessary to display an image. The backlight unit is classified as either an edge type or a direct type in accordance with the disposition of its light source.

The edge type backlight unit includes a light source which is disposed in a position corresponding to a side of the LCD panel. Also, the edge type backlight unit irradiates light emitted from the light source onto the entire surface of the LCD panel using a light guide panel. On the other hand, the direct type backlight unit includes a plurality of light sources arranged opposite the rear surface of the LCD panel. These plural light sources directly apply light to the rear surface of the LCD panel. The direct type backlight unit has a higher brightness and a wider luminescent surface than the edge type backlight unit because it employs plural light sources.

The LCD panel includes a thin film transistor substrate and a color filter substrate which are opposite each other. The thin film transistor substrate is combined with the color filter substrate by a seal pattern. Then, a liquid crystal material is injected between the thin film transistor substrate and the color filter substrate.

The LCD device further includes a top case for preventing the warping of an LCD device. The top case encompasses the edge of upper surface of the LCD panel and is combined with the backlight unit, thereby protecting edges of the LCD panel.

The top case is generally formed from a metal material so that it has characteristically high strength. As such, if the top case comes in contact directly with the LCD device, the contacted edge of the LCD panel can be damaged. In order to prevent the direct contact between the top case and the LCD panel, ordinary LCD devices are being designed to provide a gap between the top case and the LCD panel.

However, the gap between the LCD panel and the top case in the ordinary LCD device enables light from the backlight unit to be discharged to the exterior. In other words, light leakage in the edge of the ordinary LCD device is caused by the gap between the top case and the LCD panel. Therefore, the display quality of LCD device is deteriorated.

In addition, the gap between the top case and the LCD panel allows foreign substances to intrude from the exterior into the LCD device. The foreign substances intruding into the LCD device can be visible to a user.

BRIEF SUMMARY

Accordingly, the present embodiments are directed to an LCD device that substantially obviates one or more of problems due to the limitations and disadvantages of the related art.

An object of the present embodiment is to provide an LCD device that is adapted to prevent an intrusion of foreign substance and a light leakage phenomenon.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, an LCD device includes: a liquid crystal display panel; a backlight unit disposed under the liquid crystal display panel and configured to applied light to the liquid crystal display panel; a top case configured to encompass an upper edge surface of the liquid crystal display panel and to be combined with the backlight unit; and a plurality of protective pads arranged on a lower edge surface of the top case and set opposite the upper edge surface of the liquid crystal display panel. The protective pads configured to each include first and second side portions which are separated from the second and first side portions of the other adjacent protective pads by a fixed interval and engage with the second and first side portions of the other adjacent protective pads.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
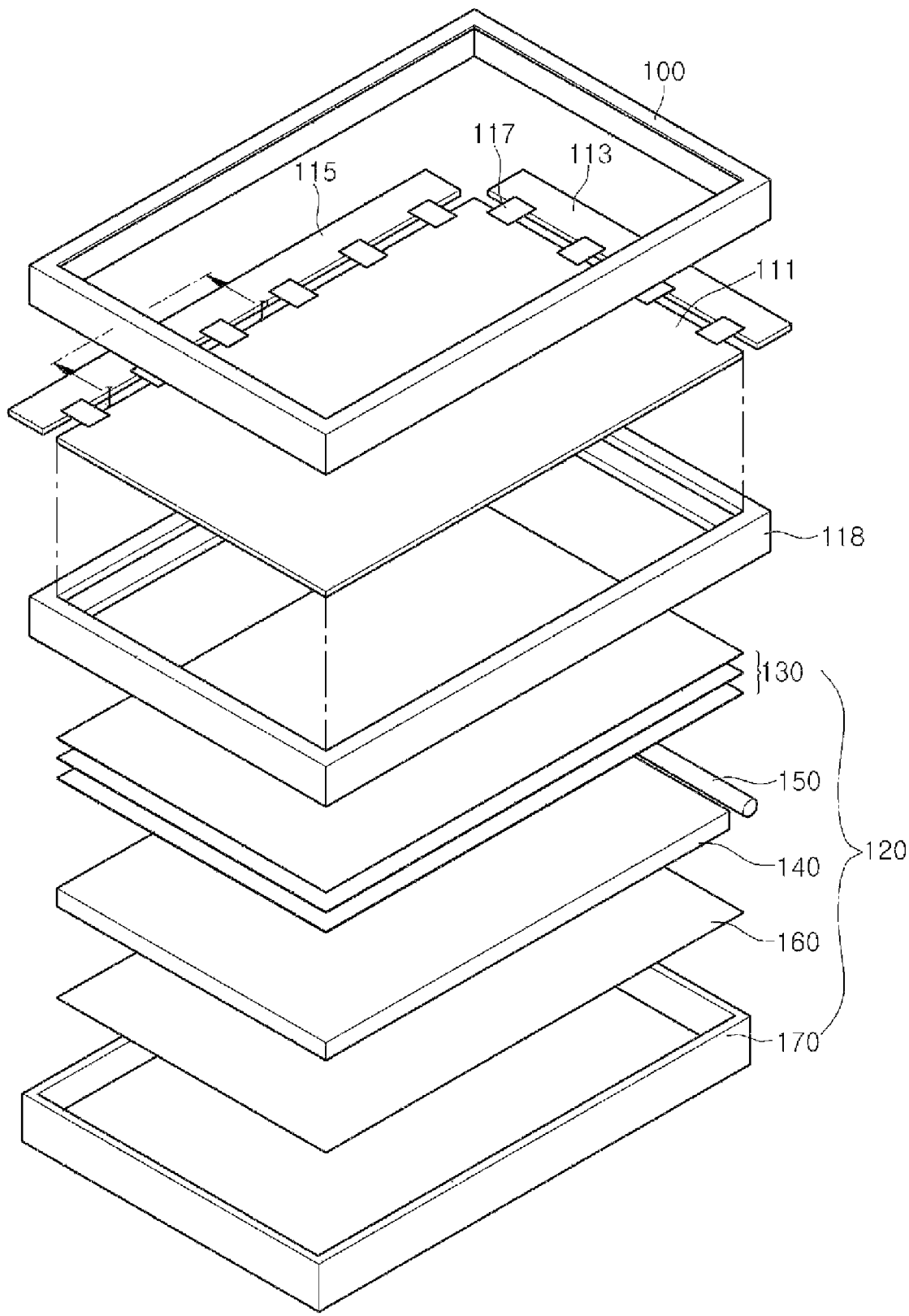
FIG. 1 is a disassembled perspective view showing an LCD device according to an embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
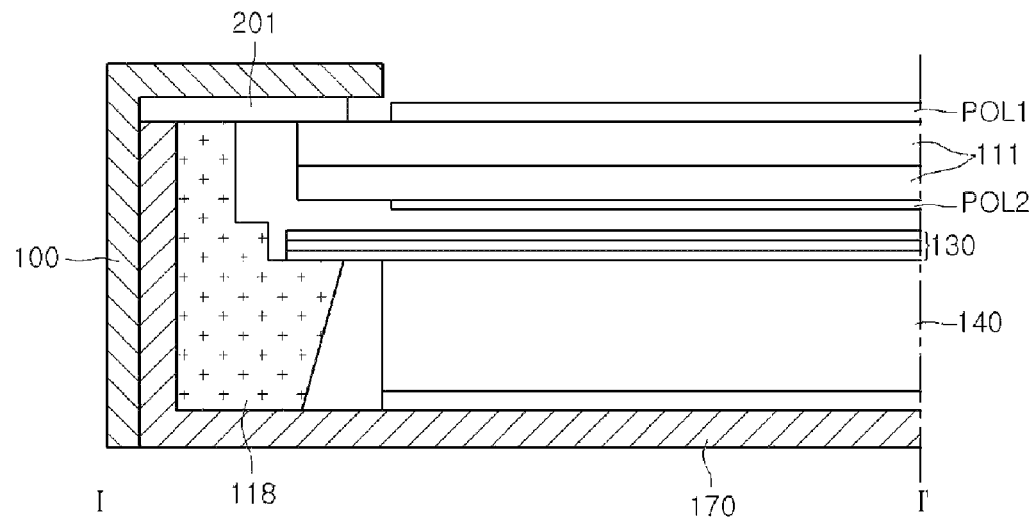
FIG. 2 is a cross-sectional view showing the LCD device taken along a line I-I' in FIG. 1.
Figure 3:
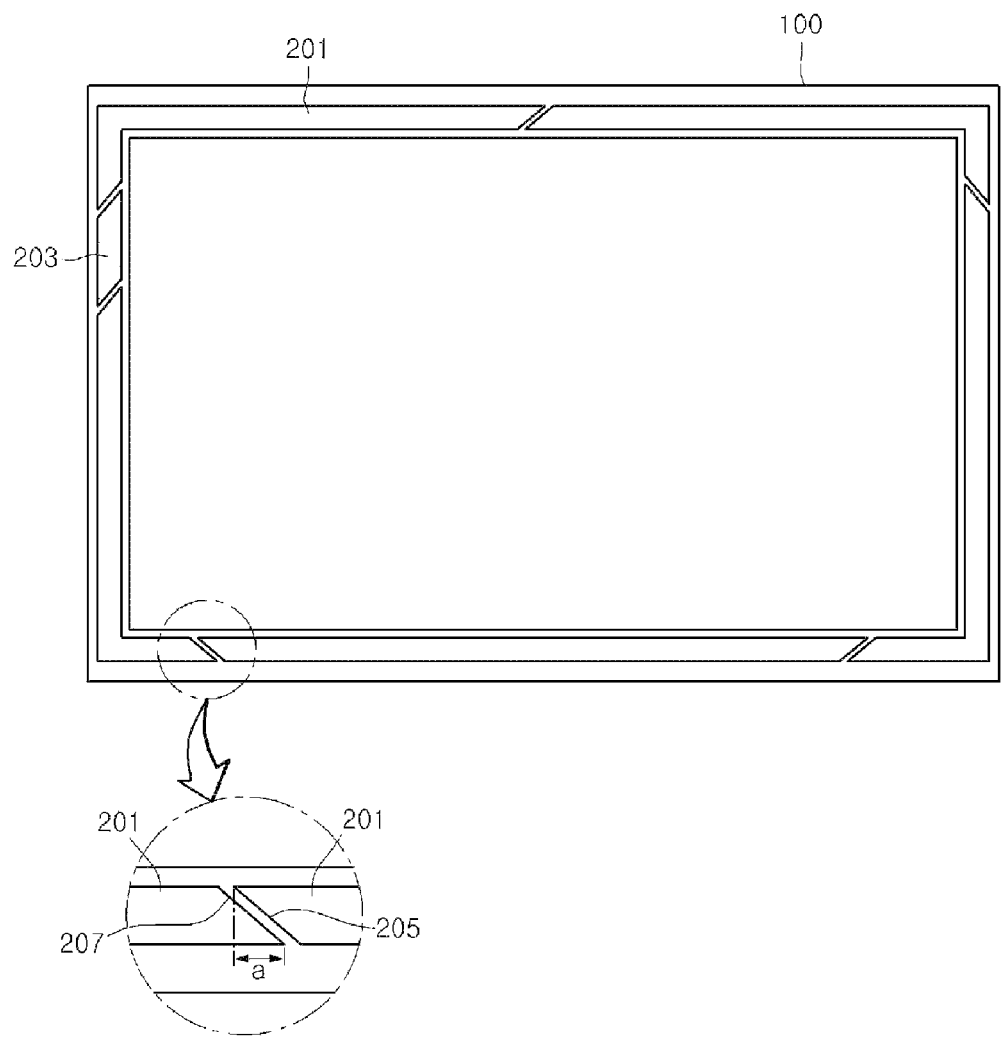
FIG. 3 is a planar view showing the inner side of a top case according to an embodiment of the present disclosure.

FIG. 1 is a disassembled perspective view showing an LCD device according to an embodiment of the present disclosure. FIG. 2 is a cross-sectional view showing the LCD device taken along a line I-I' in FIG. 1. FIG. 3 is a planar view showing the inner side of a top case according to an embodiment of the present disclosure.

Referring to FIGS. 1 to 3, an LCD device according to an embodiment of the present disclosure includes: an LCD panel 111 for displaying an image; a backlight unit 120 disposed on the rear surface of the LCD panel 111 and configured to provide light to the LCD panel 111; and a support main 118 configured to support the edge of the rear surface of the LCD panel 111 and combined with the backlight unit 120. The LCD device further includes a top case 100 configured to encompass the edge of the upper surface of the LCD panel 111 and combined with the backlight unit 120.

Although it is not shown in detail in the drawings, the LCD panel 111 includes a thin film transistor (TFT) substrate and a color filter substrate which are combined to face each other and maintain a uniform cell gap between them, as well as a liquid crystal layer interposed between the substrates. The TFT substrate includes a plurality of gate lines formed on it, a plurality of data lines formed crossing the plural gate lines, and a TFT formed at each intersection of the gate and data lines.

An upper polarizing plate POL1 is disposed on an upper surface of the LCD panel 111. A lower polarizing plate POL2 is disposed on a lower surface of the LCD panel 111.

A gate driver printed circuit board (PCB) 113 is provided on an edge of the LCD panel 111 and a data driver PCB 115 is provided on another edge of the LCD panel 111. The gate driver PCB 113 applies a scan signal to the gate line. The data driver PCB 115 applies data signals to the data lines. In this case, the gate driver PCB 113 and the data driver PCB 115 are electrically connected to the LCD panel 111 by means of a chip-on-film (COF) 117. The COF 117 can be replaced by a tape carrier package (TCP).

The backlight unit 120 includes a bottom cover 170 opened upward, at least one light source 150 arranged an inner side of the bottom cover 170, a light guide plate 140 disposed parallel to the light source 150, optical sheets 130 stacked on the light guide plate 140, and a reflective sheet 160 disposed under the light guide plate 140. The light guide plate 140 converts incident light from the light source 150 into two-dimensional light. The optical sheets 130 converge and disperse light. The reflective sheet 160 reflects light progressing downwardly from the light guide plate 140 toward the LCD panel 111, thereby reducing light loss.

According to an embodiment of the present disclosure, a plurality of protective pads 201 separated from one another and a grounding pad 203 are arranged on a lower surface of the top case 100.

The grounding pad 203 prevents the damage of the driver PCBs 113 and 115 caused by static electricity. To this end, the grounding pad 203 electrically connects the LCD panel 111, the gate and data driver PCBs 113 and 115, and the top case 100 with one another. In addition, the grounding pad 203 prevents the damage of the LCD panel 111 caused by friction between the top case 100 and the LCD panel 111.

The plurality of protective pads 201 and the grounding pad 203 prevent the damage of the LCD panel 111 from friction between the top case 100 and the LCD panel 111. To this end, the plurality of protective pads 201 and the grounding pad 203 are stuck at a fixed interval along a lower surface of the top case 100. More specifically, the plurality of protective pads 201 are arranged along a lower edge surface of the top case 100 opposite an upper edge surface of the LCD panel 111. Furthermore, the protective pad 201 is separated so as to be plural and is stuck to the lower edge surface of the top case 100. As such, the adhering work efficiency of the protective pad 201 can be improved.

Each of the protective pads 201 has both side portions (hereinafter, "first and second side portions") 205 and 207 which are symmetrically inclined parallel to those of the other adjacent protective pads 201. In other words, the first side portion 205 of one protective pad 201 is separated from the second side portion 207 of the adjacent protective pad 201 by the fixed interval. The first and second side portions 205 and 207 of the adjacent protective pads 201 are formed in the same alternate angle with respect to their inclined surfaces. As such, the first and second side portions 205 and 207 adjacent to each other overlap each other by a fixed length of "a" in a longish direction of the edge surface of the top case 100.

In the same manner, the grounding pad 203 includes first and second side portions which are formed in the same manner as those of the protective pad 201. Therefore, the grounding pad 203 is disposed between two protective pads 201 in such a manner to engage with those.

Each of the protective pads 201 has both side portions (hereinafter, "first and second side portions") 205 and 207 which are inclined parallel to those of the other adjacent protective pads 201. The first side portion 205 of one protective pad 201 is separated from the second side portion 207 of the adjacent protective pad 201 by the fixed interval. The second side portion 207 of one protective pad 201 is also separated from the first side portion 207 of the adjacent protective pad 201 by the fixed interval. Also, the first end portion 205 of one protective pad 201 and the second end portion 207 of the adjacent protective pad 201 are formed to each have the same alternate angle (or inner angle) as the other with respective to their inclined surfaces (or their inclined lines). Furthermore, one of the first and second side portions 205 of each protective pad 201 is formed to inwardly incline as it goes from the outer side toward the inner side of the edge surface of the top case 100. The other one of the first and second side portions 205 and 207 of each protective 201 is formed to inwardly incline as it goes from the inner side toward the outer side of the edge surface of the top case 100.

As such, the first and second side portions 205 and 207 of one protective pad 201 each overlap with the second and first side portions 207 and 205 of the adjacent protective pads 201 by a fixed length of "a" in a direction which progresses from the inner side toward the outer side of the top case 100. In addition, the first and second side portions 205 and 207 of the protective pad 201 are arranged to each engage with the second and first side portions 207 and 205 of the other adjacent protective pads 201.

In this manner, the LCD device according to an embodiment of the present disclosure allows each of the protective pads 201 and the ground pad 203 to include the first and second side portions 205 and 207 which are symmetrically inclined parallel to those of other adjacent protective pads 201 or another adjacent protective pad 201 and adjacent grounding pad 203. Also, the first and second side portions 205 and 207 each have the same alternate angle (or inner angle) as the other with respect to their inclined surface. Furthermore, the first and second side portions 205 and 207 overlap with each other by the fixed interval in a longish direction of the edge surface of the top case. As such, foreign substances have difficulty intruding into the inner side of the LCD device. Therefore, the deterioration of display quality by the foreign substances can be prevented.

In addition, the plurality of protective pads 201 and the grounding pad 203 which each have the first and second side portions 205 and 207 intercept light progressing from the backlight unit 120 toward the exterior. Accordingly, the LCD device according to an embodiment of the present disclosure can prevent the light leakage phenomenon.

Figure 4:
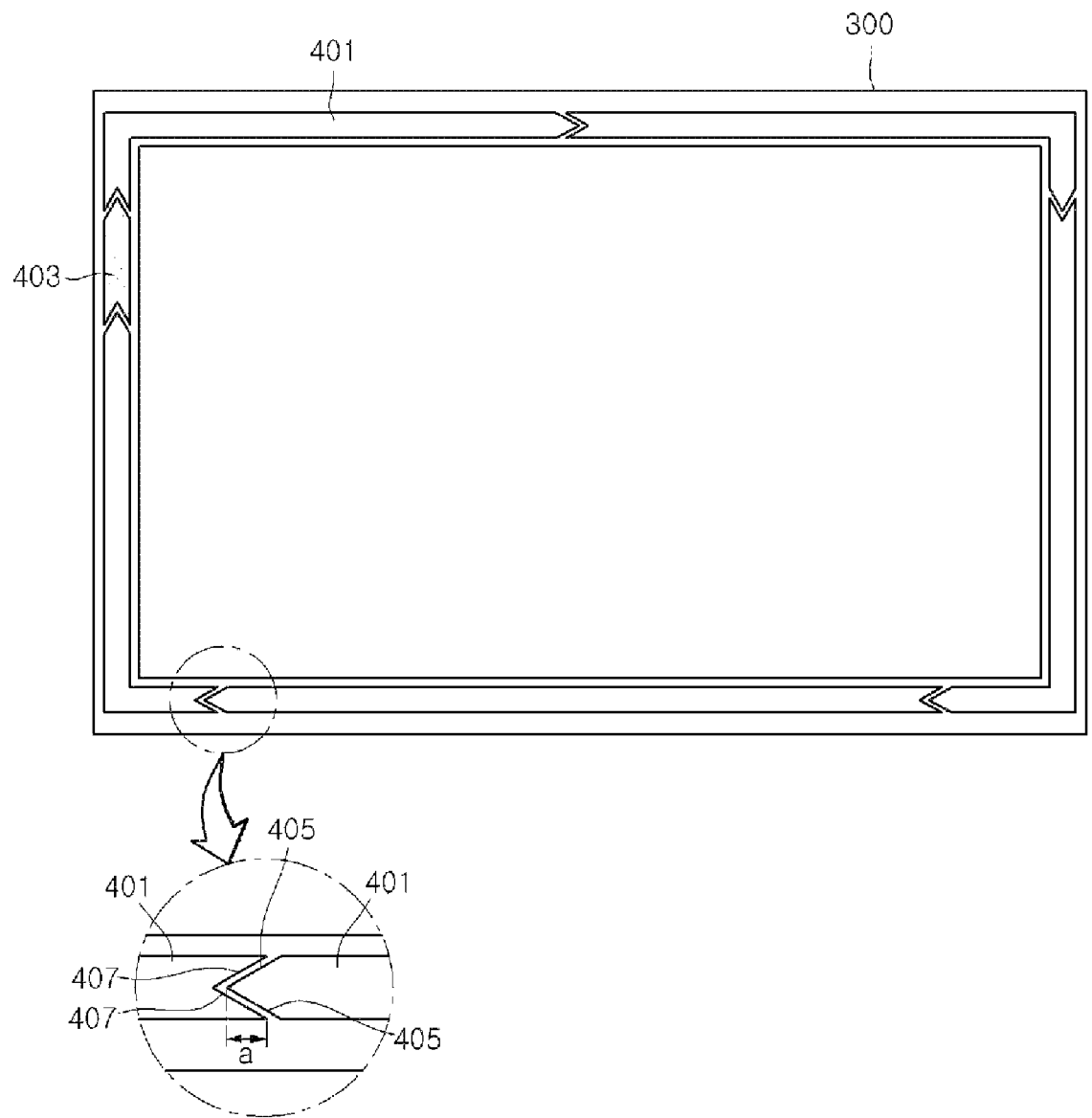
FIG. 4 is a planar view showing the inner side of a top case according to another embodiment of the present disclosure.

FIG. 4 is a planar view showing the inner side of a top case according to another embodiment of the present disclosure.

As shown in FIG. 4, a plurality of protective pads 401 separated from one another and a grounding pad 403 are arranged on the lower surface of a top case 300 according to another embodiment of the present disclosure.

The grounding pad 403 prevents the damage of the driver PCBs 113 and 115 from static electricity. To this end, the grounding pad 403 electrically connects the LCD panel 111, the gate and data driver PCBs 113 and 115, and the top case 300 with one another. Also, the grounding pad 403 prevents the damage of the LCD panel 111 from friction between the top case 100 and the LCD panel 111.

The plurality of protective pads 401 and the grounding pad 403 prevent the damage of the LCD panel 111 from friction between the top case 300 and the LCD panel 111. To this end, the plurality of protective pads 401 and the grounding pad 403 adhere at a fixed interval to the lower surface of the top case 300. More specifically, the plurality of protective pads 401 and the grounding pad 403 are arranged along a lower edge surface of the top case 300 which is opposite a lower edge surface of the LCD panel 111. Furthermore, the protective pad 401 is separated so as to be plural and is stuck to the lower edge surface of the top case 300. As such, the adhering work efficiency of the protective pad 401 can be improved.

Each of the protective pads 401 has both side portions (hereinafter, "first and second side portions") 405 and 407 opposite to those of other adjacent protective pads 401. The first side portion 405 protrudes from one side of the protective pad 401 toward an outer direction thereof. Also, the first side portion 405 is configured to include inclined surfaces which incline at one pair of symmetrical angles along a protruding direction. Consequently, the first side portion 405 is formed to protrude in a mountain shape in the lateral direction of the protective pad 401. On the other hand, the second side portion 407 is formed to cave from another side of the protective pad 401 toward an inner direction and to have an opposite shape to the first side portion 405. Also, the second side portion 407 is configured to include inclined surfaces which incline at one pair of symmetrical angles toward the inner direction. In other words, the second side portion 407 is formed in a groove shape opposite to the mountain shape of the first side portion 405. As such, the first and second side portions 405 and 407 adjacent to each other overlap with each other by a fixed length of "a" in a longish direction of the edge surface of the top case 300.

In the same manner, the grounding pad 403 includes first and second side portions 405 and 407 which are formed in the same manner as those of the protective pad 401. Therefore, the grounding pad 403 is disposed between two protective pads 201 in such a manner to engage with those.

In this way, the LCD device according to another embodiment of the present disclosure allows each of the protective pads 401 and the ground pad 403 to include the first and second side portions 405 and 407 which are formed in the mountain and groove shapes and is opposite to those of other adjacent protective pads 401 or another adjacent protective pad 401 and adjacent grounding pad 403. Also, the first and second side portions 405 and 407 overlap each other by the fixed interval in a longish direction of the edge surface of the top case. As such, foreign substances have difficulty intruding into the inner side of the LCD device. Therefore, the deterioration of display quality by the foreign substances can be prevented.

In addition, the plurality of protective pads 401 and the grounding pad 403 which each have the first and second side portions 405 and 407 intercept light progressing from the backlight unit 120 toward the exterior. Accordingly, the LCD device according to an embodiment of the present disclosure can prevent the light leakage phenomenon.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. A liquid crystal display device comprising:
   a liquid crystal display panel;
   a backlight unit disposed under the liquid crystal display panel and configured to applied light to the liquid crystal display panel;
   a top case configured to encompass an upper edge surface of the liquid crystal display panel and to be combined with the backlight unit; and
   a plurality of protective pads arranged on a lower edge surface of the top case and set opposite the upper edge surface of the liquid crystal display panel,
   wherein the protective pads configured to each include first and second side portions which are separated from the second and first side portions of the other adjacent protective pads by a fixed interval and engage with the second and first side portions of the other adjacent protective pads,
   wherein the first and second side portions of the adjacent protective pads are formed to incline parallel to each other and to each have the same alternate angle to the other with respect to their inclined surfaces.

2. The liquid crystal display device claimed as claim 1, wherein the first side portion is formed in a mountain shape which outwardly protrudes from one side of the protective at one pair of symmetrical angles to the protruding direction.

3. The liquid crystal display device claimed as claim 1, wherein the second side portion is formed in a groove shape which outwardly caves from one side of the protective at one pair of symmetrical angles to the caving direction.

4. The liquid crystal display device claimed as claim 1, wherein the first and second side portions are formed to have shapes opposite to each other.

5. The liquid crystal display device claimed as claim 1, further comprises a ground pad disposed between the protective pads and configured to connect the liquid crystal display panel with the top case.

6. The liquid crystal display device claimed as claim 5, wherein the grounding pad is configured to include first and second side portions which are formed opposite the second and first side portions of the adjacent protective pads.

7. The liquid crystal display device claimed as claim 1, wherein the first and second side portions overlap with each other in a longish direction of the edge surface of the top case.

8. The liquid crystal display device claimed as claim 1, wherein one of the first and second side portions of each protective pad is formed to inwardly incline as it goes from the outer side toward the inner side of the edge surface of the top case, and the other one is formed to inwardly incline as it goes from the inner side toward the outer side of the edge surface of the top case.

* * * * *